Sept. 6, 1938.  H. D. GEYER  2,129,125
BEARING HAVING A NONMETALLIC FABRIC LINING AND METHOD OF MAKING SAME
Filed March 27, 1935  2 Sheets-Sheet 1

INVENTOR
Harvey D. Geyer
BY
Spencer, Hardman & Fehr
HIS ATTORNEYS

Sept. 6, 1938.  H. D. GEYER  2,129,125
BEARING HAVING A NONMETALLIC FABRIC LINING AND METHOD OF MAKING SAME
Filed March 27, 1935  2 Sheets-Sheet 2

INVENTOR
Harvey D. Geyer
BY
Spencer Hardman & Fehr
HIS ATTORNEYS

Patented Sept. 6, 1938

2,129,125

UNITED STATES PATENT OFFICE 2,129,125

BEARING HAVING A NONMETALLIC FABRIC LINING AND METHOD OF MAKING SAME

Harvey D. Geyer, Dayton, Ohio, assignor to General Motors Corporation, Detroit, Mich., a corporation of Delaware Application March 27, 1935, Serial No. 13,366

5 Claims. (Cl. 154—2)

This invention relates to a method of firmly bonding a non-metallic fibrous lining to a supporting metal back, and to fibrous-lined bearings or other articles produced by this method.

In bearings or other articles made by this method the non-metallic fibrous lining is metal-bonded to its supporting metal back and hence is very strongly fixed throughout the contacting surfaces by a bond which will withstand rough usage and relatively high temperatures, and will not be destroyed or weakened by any ordinary liquids or known bearing lubricants.

An object of the invention therefore is to provide bearings or other articles of the above character.

Another object of this invention is to provide a simple, highly efficient, and inexpensive method of metal-bonding a non-metallic fibrous lining to a supporting metal back.

Further objects and advantages of the present invention will be apparent from the following description, reference being had to the accompanying drawings, wherein a preferred embodiment of the present invention is clearly shown.

Figure 6:
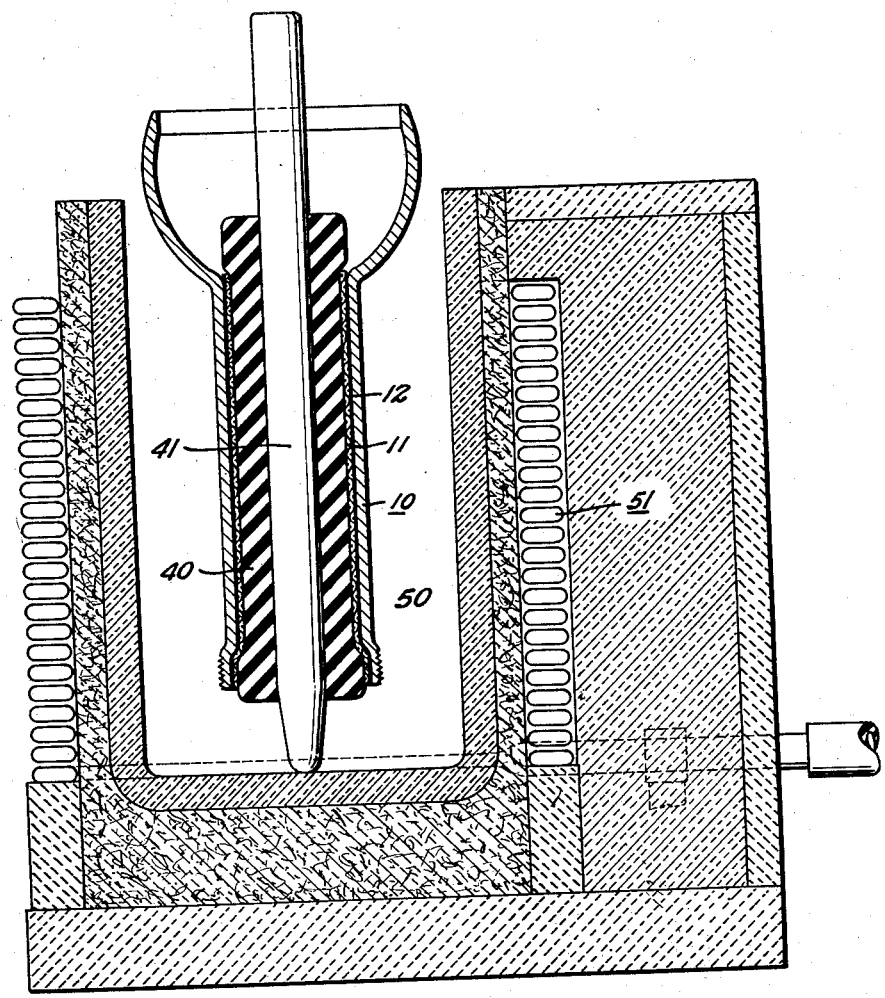

Fig. 6 illustrates the final step in the method of this invention. The spray-coated fabric sleeve is held pressed tightly against the interior surface of the metal sleeve by a non-metallic expandible core, while the whole unit is placed within an electric induction furnace. The eddy currents originate the desired heat within the metal sleeve itself, and hence the intervening stratum of low-melting metal between the fabric and metal sleeves can be fused or softened sufficiently rapidly that the fabric sleeve will not be damaged by the heat and a permanent strong metal bond between the fabric and metal sleeves will be obtained.

Similar reference characters refer to similar parts throughout the several views.

Figure 1:
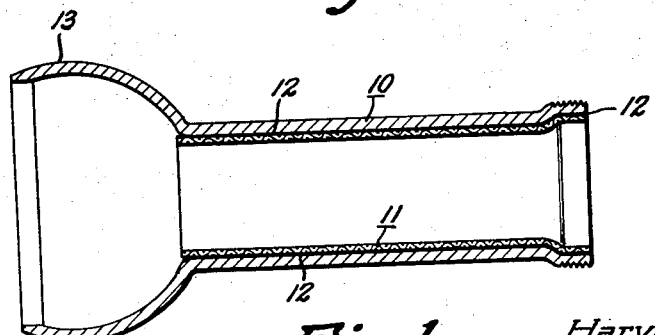
Fig. 1 is a longitudinal section through a universal ball joint bearing sleeve for the torque tube bearing in an automobile chassis. The cylindrical fabric bearing lining in this figure is attached to the outer metal sleeve by the methods of this invention.
Figure 3:
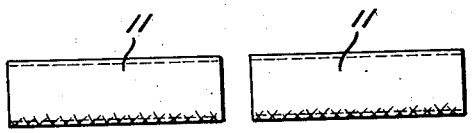
Fig. 3 shows a side view of two separate cylindrical fabric sleeves, cut to the proper length, before being inserted in the metal sleeve of Fig. 2.
Figure 2:
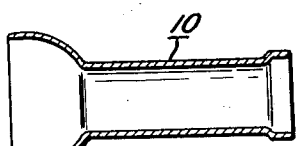
Fig. 2 is a sectional view showing the metal sleeve before the fabric lining has been inserted therein.

Numeral 10 designates the metal sleeve, shown in Figs. 1 and 2, which is made of a ferrous metal, steel. A series of tubular fabric pieces 11, shown in Fig. 3, are provided. These may be of tubular woven or flat-woven cotton fabric, or of any other suitable non-metallic fibrous material that is yielding to the desired degree and hence capable of insulating against vibration. Fig. 1 shows the fabric lining 11 securely surface-bonded to the inner surface of the metal sleeve 10 by a thin stratum 12 of a suitable low-melting metal. Such low-melting metal may be an alloy of tin and lead, or a suitable alloy of the bismuth-lead-tin cadmium groups of low melting alloys. The fabric lining 11 is then impregnated with a suitable lubricant such as lubricating oil or grease, or a finely divided solid lubricant such as graphite. But preferably there is used in such bearings a dry lubricating material consisting chiefly of a matrix of high viscosity cellulose nitrate with a suitable plasticizer incorporated therein and finely divided amorphous graphite. This lubricant may be made and applied to the fabric 11 as disclosed and claimed in my prior application Serial No. 680,740, filed July 17, 1933, for a Solid lubricating material which issued as Patent No. 2,029,366 on February 4, 1936. The fabric lining 11, after being impregnated with any suitable lubricant, provides a resilient non-metallic sliding bearing for the inserted torque tube (not shown) and isolates the supported torque tube from metallic contact with the metal sleeve 10 which is integral with the universal ball member 13. Thus vibrations in the torque tube are minimized and prevented from being directly transmitted to the ball joint and thence to the chassis frame of the automobile.

Figure 4:
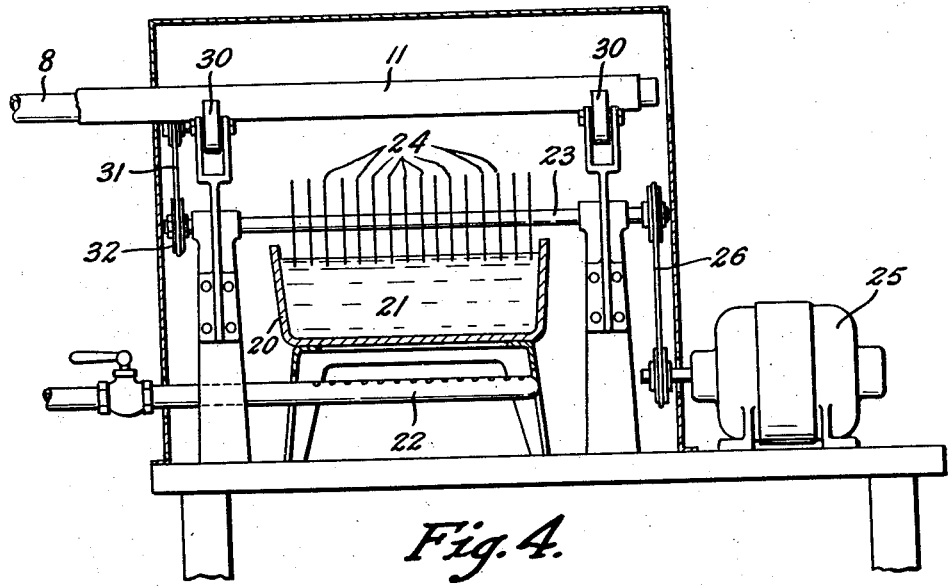
Fig. 4 illustrates a machine and method for spray-coating with a low-melting metal a series of fabric sleeves of Fig. 3 prior to their insertion in the metal sleeves.
Figure 5:
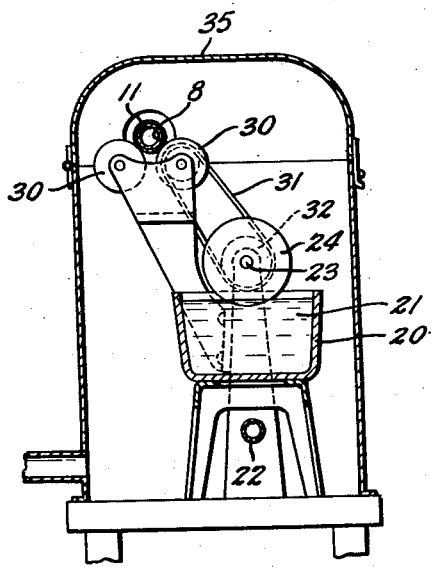
Fig. 5 is an end view, partly in section, of the machine shown in Fig. 4.

The method of bonding the fabric lining 11 to the outer metal sleeve 10 will now be described. The fabric sleeves are cut to length (as shown in Fig. 3) and a series of them are slipped upon a removable mandrel 8 in endwise contact, or if desired the long fabric tube may be slipped upon mandrel 8 and the separate sleeves 11 cut off therefrom after they have been spray-coated in the machine shown in Figs. 4 and 5. This spray-coating machine comprises a container 20 in which a supply of the above described low melting metal alloy 21 is kept in a molten state by the gas burner 22 located under the container. Directly above container 20 is mounted a rotating shaft 23 having a series of thin metal spraying disks 24 fixed thereto, these disks being of a metal having a melting point sufficiently high to prevent damage thereto by insertion in the molten metal alloy 21. The level of the molten alloy 21 is kept at such a point that the lower portions of disks 24 are immersed therein. Now when shaft 23 is driven at a suitably high speed by the motor 25 and the drive belt 26, the thin spray disks 24 will pick up the molten metal 21 and throw it off radially in very fine particles thus giving something which may be called a metal mist. The higher the speed of rotation of disks 24 the finer will be the molten metal particles thrown off thereby, and vice versa within limits. Thus the average size of the fine particles may be varied to give the best adherence for any particular fabric which is being used.

The mandrel 8, upon which the fabric 11 is mounted, is laid upon the revolving rollers 30 and moved lengthwise in the path of the molten metal spray from disks 24 until a uniform spray-coat 12 of the desired thickness has been applied there'o. The rollers 30 are driven by the belt 31 and pulley 32 fixed to shaft 23 in the form shown in the drawings. Obviously if desired rollers 30 may not be power driven and the mandrel 8 may be simply rolled over to a new position by hand after each passage of mandrel 8 longitudinally through the molten metal spray until the entire cylindrical surface of the fabric tube 11 is uniformly covered with a spray-coat 12 of the desired thickness. Preferably removable metal shields are provided to catch the unused portion of the metal spray from the disks 24 and thus prevent the depositing of the metal spray upon other parts of the machine. By this means the metal deposited upon the removable shields may be salvaged at desired intervals simply by removing the shields and melting the deposited metal therefrom. It is desirable to spray the metal from disks 24 through an atmosphere of inert, non-oxidizing, or reducing gas in order to prevent partial oxidation of the fine metal particles during transit or after they have been deposited upon fabric 11. For this purpose the housing 35 may be kept filled with the non-oxidizing atmosphere all during the spraying operation.

By this method of spray-coating the metal particles are thrown by centrifugal force with such high speed against the fabric 11 that they will adhere very strongly thereto and yet will not burn the vegetable fiber thereof to any material extent. The molten metal particles hit the fabric 11 with such speed that they partially penetrate into the fibers thereof while said particles are yet plastic and thus the spray-coat is substantially keyed to the fabric 11. The uniform fineness of these metal particles however causes them to be cooled so rapidly upon the fabric that they solidify without burning away their keying effect. Of course if the fabric 11 is an asbestos fabric, the particles of the spray-coat thrown thereagainst may be quite large without any harmful results to the fabric and a deeper penetration of the fabric thus obtained. As stated above, the size of the metal particles may be readily adjusted by adjusting the speed of the disks 24 to give the best results with the particular kind of fabric being used, considering both the kind of material thereof and the coarseness or looseness of its fibers.

Now after the fibrous sleeves 11 have been spray-coated with the still flexible coating 12 (as above described) they are slipped endwise from the mandrel 8 and inserted loosely one into each of the metal sleeves 10, the interior surfaces of which have first been treated so that it will more readily bond to the spray-coat 12 when heated to the proper temperature. Such treating of the inside surface of the metal sleeve 10 may be only proper cleaning and fluxing thereof; but preferably when sleeve 10 is of steel or ferrous metal, its bonding surface is first coated with some other metal coat which will more readily bond or alloy with the spray-coat 12 upon the fabric sleeve 11 when subsequently heated in contact therewith. For instance, the inside surface of the steel sleeve 10 may be coated with copper, tin, zinc, or with the same low-melting alloy forming the spray-coat 12 whatever that may be.

Fig. 6 shows one method of pressing the spray-coated surface 12 on the fabric 11 snugly against the inside surface of the metal sleeve 10. This is done here by inserting an expandible cylinder 40 of soft rubber (or other yielding non-metallic material) into the fabric sleeve 11 and then forcing an expanding pin 41 of wood or other non-metallic material through its central aperture. The flexibility and expansibility of the coated fabric tube 11 readily permits the desired pressure to be obtained between the two metal surfaces which are to be bonded together by heat during this step in the method. The unit, thus assembled, is then inserted bodily within the induction field 50 of an electric induction furnace 51 as shown somewhat diagrammatically in Fig. 6. Since the metal sleeve 10 and the spray-coat 12 are the only metal portions of the inserted unit, these will be the only parts which will heat up due to the induced eddy currents. Hence all the heat will originate within the metal sleeve 10 and the spray-coat 12 and thus the spray-coat 12 will be very quickly brought up to the necessary temperature to cause it to bond to or alloy with the interior treated surface of sleeve 10. Preferably such an induction capacity is used that only a few seconds will be required to cause the spray-coat 12 to properly bond to the metal sleeve 10. The speed of heating the spray-coat 12 to its bonding temperature is of high importance, because if it be heated only very slowly there will be that much more time for the heat to be conducted to the fabric 11 with the possibility of scorching same and so weaken its keyed interlock with the spray-coat 12. If the fabric 11 be of asbestos or mineral fiber, obviously the speed of heating is not important from this standpoint and hence any other convenient method of heating may be used.

It is to be understood that the methods herein disclosed may be applied for making other forms of bearings than that chosen for illustration. For instance, the same principles may be applied for making half-cylindrical bearings, or flat bearings, or ball and socket bearings, or thrust bearings. Obviously in each case it is necessary only that the spray-coated fabric lining be pressed into snug contact with its metal backing and then sufficient heat be applied to cause the spray-coat 12 to bond to the metal backing, thus providing a very strong uniform surface bond between the fabric lining and its supporting metal backing.

Also it is to be understood that the principles of this invention may be applied for making any article other than bearings wherever it is desired to bond a non-metallic fabric sheet or fabric portion of any shape to a metal backing by means of a strong metal bonding stratum 12 which is interlocked or keyed into the fiber interstices of the non-metallic fabric. For instance, the principles of this invention may be used for strongly bonding asbestos fabric sheets to opposite sides of a steel reinforcing sheet for making a blank from which automobile engine head gaskets or other gaskets may be punched or cut out by suitable dies. In this case, it is preferable to spray-coat one side of each of the two asbestos sheets with the spray-coat 12 of this invention and to properly coat both sides of the steel sheet with a low-melting alloy which will bond to the spray-coat 12 at a convenient temperature. For this purpose it has been found practical to suitably flux the steel sheet and then dip it into a molten alloy comprising 20 parts copper, 40 parts lead, and 40 parts tin, which coats the steel sheet on both sides thereof. This coated steel sheet is then run through a pair or a series of pairs of pressure rolls with the two spray-coated asbestos sheets on its opposite sides while the dip coating on the steel sheet is yet in semi-plastic form, that is, before it has cooled enough to become solid. The pressure of the rolls causes the spray-coats 12 on the two asbestos sheets to alloy with and strongly bond the asbestos sheets to the steel sheet.

While the embodiment of the present invention as herein disclosed, constitutes a preferred form, it is to be understood that other forms might be adopted, all coming within the scope of the claims which follow.

What is claimed is as follows:

1. The steps in the method of surface-bonding a non-metallic fibrous lining to a metal back, comprising: initially providing a suddenly cooled spray coat of a low-melting metal upon said fibrous lining by throwing fine particles of molten low-melting metal with high speed by centrifugal force from rapidly rotating disks and causing same to impinge against said fibrous lining and strongly key thereto, and subsequently pressing said spray-coated surface of the lining against a metal back at a raised temperature and thereby causing said low-melting spray coat to bond to said metal back without destroying its initially-formed keyed adherence to said fibrous lining.

2. The steps in the method of surface-bonding a non-metallic fibrous lining to a metal back, comprising: initially providing a strongly keyed spray coat of a low-melting metal upon said fibrous lining by throwing fine particles of molten low-melting metal with high speed by centrifugal force and causing same to impinge against said fibrous lining and partially penetrate same substantially at the instant of solidifying, subsequently applying said spray-coated surface of said fibrous lining against a metal back and rapidly raising the temperature of said spray-coat until it molecularly bonds to said metal back, then quickly cooling the assembly before the penetrated portions of said spray-coat become fully molten.

3. The steps in the method of bonding a non-metallic fibrous lining to a metal back, comprising: initially providing a strongly keyed spray coat of a low-melting metal upon said fibrous lining by throwing by centrifugal force and without an accompanying gaseous blast fine particles of molten low-melting metal with high speed against said fibrous lining and thereby causing said molten particles to substantially penetrate said lining and strongly key thereto, then pressing said spray-coated surface of said lining against said surface of said metal back and rapidly heating same and thereby causing said spray-coated surface to bond to said metal back, then substantially immediately cooling the assembly.

4. The steps in the method of surface-bonding a non-metallic fibrous lining to a metal back, comprising: providing a relatively thin spray-coat of a low-melting metal upon said fibrous lining by spraying fine particles of molten low-melting metal against said fibrous lining and thereby causing same to strongly key and adhere firmly thereto, then pressing said spray-coated surface of said lining against the surface of a metal back and originating heat within the body of said metal back itself by electric induction means until a temperature is reached which will cause said spray coat to molecularly bond to said back, then quickly cooling the assembly.

5. The steps in the method of surface-bonding a non-metallic fibrous lining to the inner surface of a hollow metal back comprising: providing a coating of a relatively low-melting metal upon said lining, inserting said lining within said hollow metal back with its metal coating in contact therewith, forcing said lining outwardly against said metal back by inserting thereinto and outwardly expanding an interior expansible member, and rapidly originating heat within the body of said metal back by electric induction until a temperature is reached which will cause said metal coating to molecularly bond to said back then quickly cooling the assembly, whereby to limit any harmful effects of the bonding temperature upon said fibrous lining.

HARVEY D. GEYER.